United States Patent [19]
Jasper et al.

[11] Patent Number: 5,487,091
[45] Date of Patent: Jan. 23, 1996

[54] METHOD FOR DETERMINING SIGNAL USABILITY IN A DIVERSITY RECEIVER

[75] Inventors: Steven C. Jasper, Hoffman Estates; Mark A. Birchler, Roselle, both of Ill.

[73] Assignee: Motorola, Inc., Schaumburg, Ill.

[21] Appl. No.: 106,170

[22] Filed: Aug. 13, 1993

[51] Int. Cl.[6] ................................... H04B 7/10
[52] U.S. Cl. ........................... 375/347; 455/135
[58] Field of Search ................. 375/260, 267, 375/347, 348, 349; 455/135, 137, 226.1, 226.2, 226.3

[56] References Cited

U.S. PATENT DOCUMENTS

| | | | |
|---|---|---|---|
| 4,246,655 | 1/1981 | Parker | 455/135 |
| 4,450,585 | 5/1984 | Bell | 455/135 |
| 4,715,048 | 12/1987 | Masamura | 375/100 |
| 5,140,615 | 8/1992 | Jasper et al. | 375/100 |

Primary Examiner—Stephen Chin
Assistant Examiner—William Luther
Attorney, Agent, or Firm—Timothy W. Markison; Daniel C. Crilly

[57] ABSTRACT

A diversity receiver that receives modulated signals may determine signal usability of the received signals in the following manner. A modulated signal that includes a desired component and an undesired component is received in each receiver branch of the diversity receiver, wherein the desired component includes an originally transmitted signal and the undesired component includes noise and interference. Each receiver branch estimates the desired and undesired components and processes the modulated signal with a channel gain/phase estimator, a complex conjugator, and a complex mixer to produce a complex output. The complex output of each receiver branch is derived independently of the undesired component and combined to produce a diversity resultant. The diversity receiver estimates the signal usability of the diversity resultant based on the estimated desired components and the estimated undesired components.

7 Claims, 1 Drawing Sheet

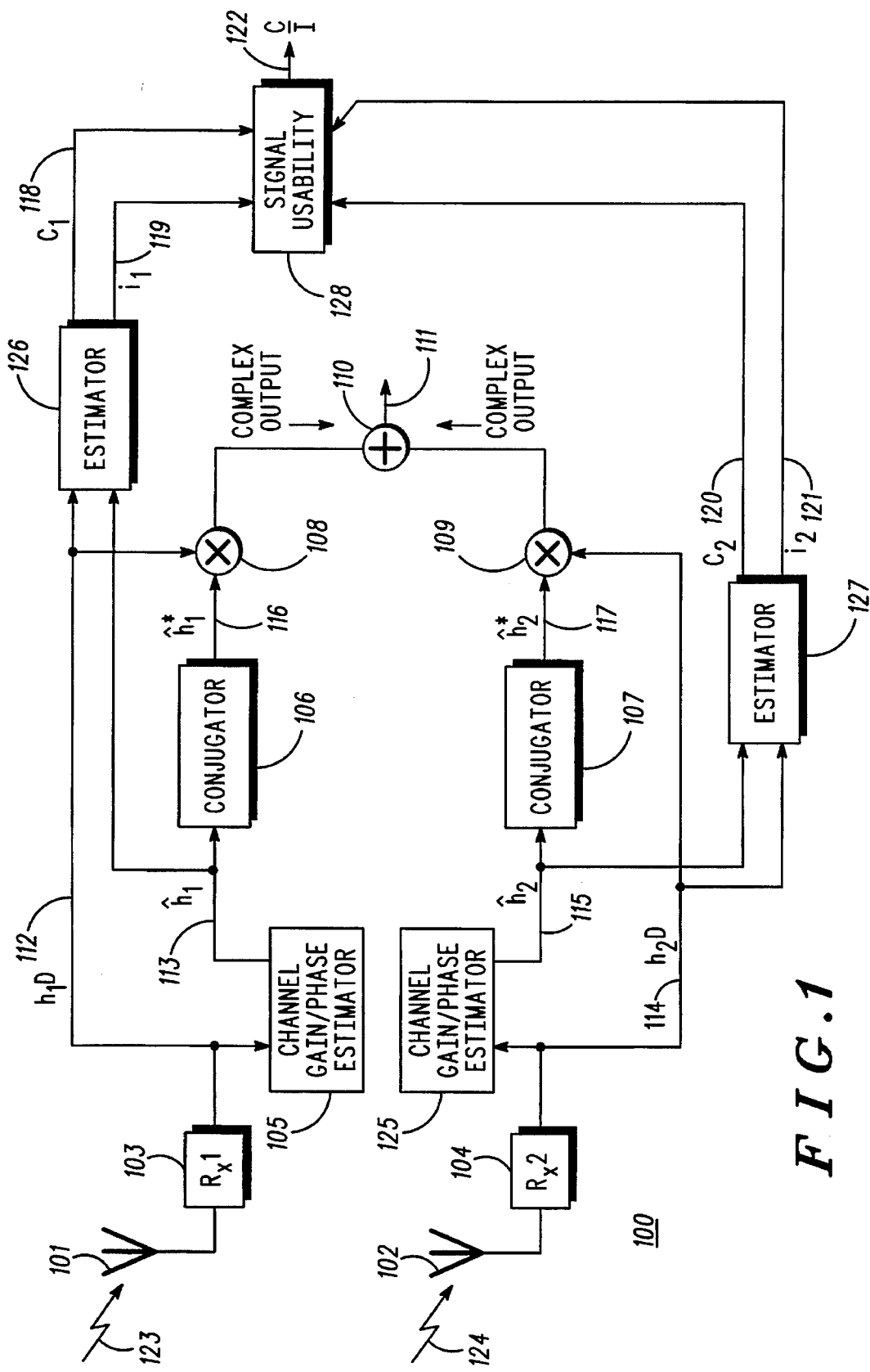

METHOD FOR DETERMINING SIGNAL USABILITY IN A DIVERSITY RECEIVER

FIELD OF THE INVENTION

This invention relates generally to radio communication systems and, in particular, to a radio communication system that utilizes diversity repeaters.

BACKGROUND OF THE INVENTION

Communication systems that geographically reuse communication resources are known. These systems allocate a predetermined set of communication resources in one geographic area and reuse the same set of communication resources in one or more other geographic areas. This reuse technique improves communication system capacity by minimizing the number of communication resources necessary to provide communication service in a large geographic area comprised of several smaller geographic areas. As is also known, communication resources are defined by the multiplexing scheme utilized in the particular communication system. For example, with frequency division multiplexing (FDM), a communication resource may be a frequency carrier or pair of frequency carriers; whereas, with time division multiplexing (TDM), a communication resource may be a time slot or pair of time slots in one or more time frames.

In geographic reuse communication systems, signal usability of a communication resource needs to be determined in order to reliably use the communication resource. Signal usability is typically limited by the quantity of co-channel interference present on the RF channel. Co-channel interference occurs when receivers receive unwanted information signals from neighboring communication units, or base stations, transmitting on the same channel as the desired RF channel. Thus, the signal usability decreases as the co-channel interference increases.

Another alteration of the transmitted signal occurs as a result of fading. Fading occurs due to multiple reflections of the modulated signal during transmission over the RF channel. These reflections typically result from unintentional reflecting of the modulated signal from obstacles in its path, such as buildings and mountains, and may produce multiple modified replications of the modulated signal, each introducing various amplitude and phase alterations of the original signal in each new signal path. All of the modulated signal replicas form a composite signal at the input to a receiver and account for the fading. For a detailed discussion of a method for measuring signal quality that accounts for frequency selective fading refer to U.S. Pat. No. 5,170,413, entitled "Control Strategy For Reuse System Assignments And Handoff" and assigned to Motorola Inc. While this technology provides many advantages, it does not address the technological concern of estimating signal usability based on a measured approximation of co-channel interference and noise.

In order to mitigate the effects of fading, radio communication systems typically utilize diversity to enhance the signal-to-noise ratio of a modulated signal in a fading environment. Diversity techniques are incorporated in communication receivers and attempt to obtain multiple, decorrelated replicas of the transmitted signal by using multiple antennas typically spaced several wavelengths apart. Each replica is received in a diversity receiver by a respective receiver branch. Upon obtaining the multiple replications, the diversity receiver either combines the received signals from each receiver branch to form a composite signal or selects the received signal with the best signal usability from one receiver branch. Thus, by receiving multiple copies of the transmitted signal, the diversity receiver produces an output signal with a better overall signal-to-noise ratio than if only one copy of the transmitted signal were received.

To estimate signal usability of the diversity receiver's output, a variety of methods may be employed. One known method scales each received signal in each receiver branch by a scaling factor proportional to the interference in each corresponding signal path, individually determines the signal usability of each receiver branch's output signal, and sums the individual signal usabilities to form a composite signal usability of the diversity receiver's output. Although this text book method provides an accurate signal usability indication, it is not practically realizable since methods for obtaining accurate measurements, or estimates, of the interference in each signal path are not readily available. Another approach to estimating the signal usability of a receiver's output is detailed in pending U.S. patent application Ser. No. 08/069,927, entitled "A Method And Apparatus For Determining Signal Usability" and assigned to Motorola Inc. Although this technological advance provides an accurate, realizable method for determining signal usability of received signals based on co-channel interference and noise, it does not address the concern of determining signal usability of a received composite signal that is formed from multiple, simultaneously received, decorrelated signals.

Therefore a need exists for a practical method of determining signal usability of a composite signal received by a diversity receiver that is based on an estimation of RF channel interference.

BRIEF DESCRIPTION OF THE DRAWINGS

FIG. 1 illustrates a diversity receiver in accordance with the present invention.

DESCRIPTION OF A PREFERRED EMBODIMENT

Generally, the present invention provides a method for determining signal usability of received signals in a diversity receiver. This is accomplished by receiving a modulated signal in each receiver branch of the diversity receiver, wherein the modulated signal includes a desired component and an undesired component. Typically, the desired component includes an original transmitted signal, modified in amplitude and phase, and the undesired component includes noise and interference. Each receiver branch processes the modulated signal with a channel gain/phase estimator, a complex conjugator, and a complex mixer to produce a complex output. The complex output of each receiver branch is derived independently of the undesired portion due to design limitations and combined to produce a diversity resultant. The receiver branches also estimate the desired and undesired components of the modulated signal which are used to determine the signal usability of the diversity resultant. By estimating the signal usability in this manner, a practical diversity receiver may be designed with an accurate representation of the signal usability of the resultant.

The present invention can be more fully described with reference to FIG. 1 which illustrates a two branch diversity receiver 100 that includes two antennas 101–102, two receivers 103–104, two channel gain/phase estimators 105 & 125, two complex conjugators 106–107, two complex mixers 108–109, a combiner 110, two desired and undesired component estimators 126–127, and a signal usability estimator 128. Each receiver 103–104 includes known receiver front-end circuitry such as filters, frequency down-converters, and analog-to-digital converters (A/Ds). The channel gain/phase estimators 105 & 125, complex conjugators 106–107, complex mixers 108–109, and combiner 110 are preferably implemented using software in a digital signal processor (DSP) that processes the digitally converted baseband signals 112 & 114 provided at the A/D output of each receiver. A detailed discussion of the desired and undesired component estimators 126–127 and the signal usability estimator 128 is provided below. Note that although the discussion below addresses a two branch diversity receiver 100, the discussion is directly applicable to diversity receivers of more than two branches.

For a description of the operation of the diversity receiver 100 and an implementation of the present invention, assume that modulated signals 123–124 are received by the antennas 101–102 of each receiver branch. The modulated signals 123–124 may comprise any analog or digitally modulated signal, such as frequency modulated (FM) signals, quadrature amplitude modulated (QAM) signals, and quaternary phase shift keying (QPSK) modulated signals. The modulated signals 123–124 include the originally transmitted signal plus undesired effects and fading of the radio frequency (RF) channel over which the modulated signals 123–124 were transmitted. These undesired effects include interference and noise.

Once the modulated signals 123–124 enter each branch, the modulated signals 123–124 are received by their respective receivers 103–104 which provide digitally converted baseband representations 112 & 114 of them to each receiver branch's channel gain/phase estimator 105 & 125. The digitally converted baseband representations 112 & 114 include an originally transmitted signal (D) scaled by the respective fading ($h_1$ and $h_2$) in each RF channel and interference and noise (not shown) provided by each RF channel. The channel gain/phase estimators 105 & 125 estimate the gain and phase of the fading in the RF transmission channels and provide these gain/phase estimates 113 & 115 ($\hat{h}_1$ and $\hat{h}_2$, respectively) to their respective conjugator 106–107. The conjugators 106–107 compute the complex conjugates 116–117 ($\hat{h}_1^*$ and $\hat{h}_2^*$, respectively) of the gain/phase estimates 113–115 and provide them to one input of their corresponding complex mixer 108–109. The complex mixers 108–109 multiply the conjugated gain/phase estimates 116–117 by the baseband representations 112 & 114 to produce two complex outputs, one from each branch. Thus, by performing the above operations on the baseband representations 112 & 114, each complex output is phase corrected to eliminate any phase shift introduced by the RF channel and weighted by an amplitude weighting factor that is proportional to the RE channel gain. This amplitude weighting factor provides optimal diversity combining when the interference and noise power levels in each RF channel are substantially identical. The complex outputs are combined by the combiner 110, or a complex adder, to produce a diversity resultant 111. The combining of the complex outputs is performed independently of any compensatory adjustments to the complex outputs based on the modulated signals undesired components, that is, the portions of the modulated signals 123–124 that include the noise and interference of the RF channels.

A variety of methods may be used by the channel gain/phase estimators 105 & 125 to produce the gain/phase estimates 113 & 115. In the known differential detection method, the channel gain/phase estimates 113 & 115 are directly derived from the received modulated signals 123–124. In another methodology, pre-established pilot signals, or symbols, are included in the modulated signals 123–124 and are used with interpolation techniques to approximate the gain and phase variation of the modulated signals 123–124 introduced by fading in the RF channels. One particular pilot-based channel gain/phase estimation method is detailed in pending U.S. patent application Ser. No. 07/783,289, entitled "Communication Signal Having A Time Domain Pilot Component" and assigned to Motorola Inc.

The desired and undesired component estimators 126–127 provide estimates of their respective modulated signal's desired and undesired components 118–121. The desired and undesired component estimators each receive their respective baseband signal representation 112 & 114 and channel gain/phase, or fading, estimate 113 & 115 from their corresponding receiver 103 and 104 and channel gain/phase estimator 105 & 125. Upon processing their inputs, the desired and undesired component estimators 126–127 produce the desired and undesired components 118–121. For a detailed discussion of a preferred method for determining each modulated signals desired component 118 & 120 ($c_1$ and $c_2$, respectively) and undesired component 119 & 121 ($i_1$ and $i_2$, respectively) refer to pending U.S. patent application Ser. No. 08/069,927, entitled "A Method And Apparatus For Determining Signal Usability" and assigned to Motorola Inc.

Upon obtaining the desired component estimates 118 & 120 and the undesired component estimates 119 & 121, the diversity receiver 100 utilizes these estimates, based on a predetermined relationship between them, to estimate signal usability (C/I) 122 of the diversity resultant 111. The signal usability estimation is initiated by determining a desired resultant component (C), i.e. the desired component of the diversity resultant 111, based on a summation of the estimated desired components 118 & 120 (i.e. $C=c_1+c_2$). In the preferred embodiment, the estimated desired components 118 & 120 are power averages of the desired portions of the modulated signals 123–124 obtained over a predetermined period of time (e.g. less than 3 seconds). Accordingly, the summation of the estimated desired components 118 & 120 is time averaged to produce the desired resultant component. Upon determining the desired resultant component, the diversity receiver 100 determines an undesired resultant component (I), i.e. the undesired component of the diversity resultant 111, based on a summation of the estimated undesired components 119 & 121 each multiplied by a scaling factor. Similar to the estimated desired components 118 & 120, the estimated undesired components 119 & 121 are preferably power averages of the undesired portions of the modulated signals 123–124 obtained over the predetermined period of time. Each scaling factor is based on a ratio of the corresponding estimated desired component 118 & 120 to the desired resultant component. Thus, the undesired resultant component is preferably determined by multiplying each estimated undesired component 119 & 121 with each corresponding estimated desired component 118 & 120, subsequently dividing the multiplied components by the summation of the estimated desired components 118 & 120, and time averaging a summation of the computed quantity. At any measurement time, the undesired resultant component is mathematically expressed as:

$$I=(i_1c_1/C)+(i_2c_2/C)$$

Upon obtaining both the desired and undesired resultant components, the diversity receiver 100 estimates the signal usability 122 based on a ratio of the desired resultant component to the undesired resultant component (C/I).

Although the previously mentioned U.S. patent application Ser. No. 08/069,927 provides an accurate method for determining signal usability of received signals, the method presented in that application is primarily applicable to receivers with only one receiver branch. Since diversity receivers include more than one branch, they provide diversity gain of the diversity resultant 111 due to the diversity combining. This diversity gain is not accounted for with the method of the referenced United States patent application. Accordingly, the present invention includes the diversity gain in its determination of signal usability 122 by basing the signal usability 122 on the desired and undesired resultant components.

The above discussion details a preferred method of estimating the signal usability 122 of the combined output of a diversity receiver 100. However, a variety of averaging schemes may be used to average the desired and undesired components 118–121 and combinations thereof. In order to describe a sampling of these averaging techniques, the notation $E\{x\}$ will be used to denote the expected value, or average, of the quantity x. In addition, the notation $\Sigma y_k$ will be used to denote a summation of the quantity y over the number of diversity branches incorporated in the diversity receiver 100, wherein the subscript k identifies the particular receiver branch number. For example, in a two branch diversity receiver 100, $\Sigma y_k = y_1 + y_2$. Given the described notations, six potential averaging schemes are mathematically expressed as follows:

$$C/I = \Sigma(E\{c_k\})/[\Sigma(E\{c_k\}E\{i_k\})/\Sigma(E\{c_k\})] \quad 1)$$

$$C/I = [\Sigma(E\{c_k\})]^2/[\Sigma(E\{c_k\}E\{i_k\})] \quad 2)$$

$$C/I = E\{[\Sigma c_k]^2/[\Sigma(c_k i_k)]\} \quad 3)$$

$$C/I = E\{[\Sigma c_k]^2\}/E\{\Sigma(c_k i_k)\} \quad 4)$$

$$C/I = E\{\Sigma c_k\}/E\{\Sigma(i_k c_k/\Sigma c_k)\} \quad 5)$$

$$(C/I)_{dB} = E\{10 \log_{10}[(\Sigma c_k)^2/\Sigma(c_k i_k)]\} \quad 6)$$

Equations 1 through 5 represent direct power ratios which may also be represented in decibels by logarithmically converting the signal usability (C/I) 122 using a known equation (i.e. $(C/I)_{dB} = 10\log_{10}(C/I)$). However, equation 6 provides a signal usability calculation directly in terms of decibels by averaging the decibels of individual power quotients. Note that the preferred embodiment of the present invention utilizes the signal usability estimation provided by equation 5.

The present invention provides a method for determining signal usability of received signals in a diversity receiver. With this invention, an accurate estimate of the signal usability of the diversity receiver's post-combined output is obtained which includes the independent effects of the desired and undesired component powers on each diversity receiver branch. This signal usability measure accounts for the diversity combining which is performed independently of the undesired component signal power existing on each branch. Known theoretical expressions for post-combined signal usability weight the complex output of each receiver branch by a weighting factor that is not only a function of channel gain and phase, but also of the undesired component signal power in each branch. However, in practice, the undesired component signal power of each branch is difficult to measure and accurately incorporate into the combining algorithm. In contrast, the present invention estimates the post-combined signal usability without using the undesired component signal power of each receiver branch to generate the combining weights in a diversity system. Further the signal usability estimate of the present invention expands the basic premise presented in a previously disclosed method for estimating signal usability to incorporate the effects of multiple branch diversity gain included in the post-combined output of a diversity receiver.

We claim:

1. In a diversity receiver that receives modulated signals, wherein the diversity receiver includes at least two receiver branches, wherein each of the at least two branches includes an antenna operably coupled to a receiver, the receiver operably coupled to a channel gain/phase estimator, the channel gain/phase estimator operably coupled to a complex conjugator, the complex conjugator operably coupled to a complex mixer to provide a complex output, and wherein the complex outputs of at least two receiver branches are combined to produce a diversity resultant, a method for determining signal usability of the diversity resultant, the method comprises the steps of:

a) receiving, by each of the at least two receiver branches, a modulated signal;

b) producing, by each of the at least two receiver branches, the complex output based on the modulated signal;

c) in each of the at least two receiver branches, estimating a desired component based on the modulated signal to produce estimated desired components;

d) in each of the at least two receiver branches, estimating an undesired component based on the modulated signal to produce estimated undesired components;

e) combining, independent of the undesired component on each of the at least two receiver branches, the complex output of each of the at least two receiver branches to produce the diversity resultant; and f) estimating signal usability of the diversity resultant based on a functional mapping of the estimated desired components and the estimated undesired components into an estimated desired-to-undesired component power ratio.

2. In the method of claim 1, step (f) further comprises the steps of:

f1) determining a desired resultant component based on a summation of the estimated desired components;

f2) determining an undesired resultant component based on a summation of the estimated undesired components each multiplied by a scaling factor, wherein each scaling factor is based on a ratio of a corresponding estimated desired component to the desired resultant component; and f3) estimating the signal usability of the diversity resultant based on a predetermined relationship between the desired resultant component and the undesired resultant component.

3. In a diversity receiver that receives modulated signals, wherein the diversity receiver includes at least two receiver branches, wherein each of the at least two branches includes an antenna operably coupled to a receiver, the receiver operably coupled to a channel gain/phase estimator, the channel gain/phase estimator operably coupled to a complex conjugator, the complex conjugator operably coupled to a complex mixer to provide a complex output, and wherein the complex outputs of at least two receiver branches are combined to produce a diversity resultant, a method for determining signal usability of the diversity resultant, the method comprises the steps of:

a) receiving, by each of the at least two receiver branches, a modulated signal;

b) producing, by each of the at least two receiver branches, the complex output based on the modulated signal;

c) in each of the at least two receiver branches, estimating a desired component based on the modulated signal to produce estimated desired components;

d) in each of the at least two receiver branches, estimating the undesired component based on the modulated signal to produce estimated undesired components;

e) combining, independent of the undesired component on each of the at least two receiver branches, the complex output of each of the at least two receiver branches to produce the diversity resultant;

f) determining a desired resultant component based on the estimated desired components;

g) determining an undesired resultant component based on the estimated undesired components, the desired resultant component, and the estimated desired components; and h) estimating signal usability of the diversity resultant based on it functional mapping of the desired resultant component and the undesired resultant component into an estimated desired-to-undesired component power ratio.

4. In the method of claim 3, the determination of step (f) comprises summing the estimated desired components to determine the desired resultant component.

5. In the method of claim 3, the determination of step (g) comprises the step of:

g1) multiplying each of the estimated undesired components with a corresponding component of the estimated desired components to produce multiplied components;

g2) dividing each of the multiplied components by the desired resultant component to produce scaled estimated undesired components; and g3) summing the scaled estimated undesired components to determine the undesired resultant component.

6. In the method of claim 3, the estimation of step (h) comprises dividing the desired resultant component by the undesired resultant component to estimate the signal usability of the diversity resultant.

7. In a diversity receiver that receives modulated signals, wherein the diversity receiver includes at least two receiver branches, wherein each of the at least two branches includes an antenna operably coupled to a receiver, the receiver operably coupled to a channel gain/phase estimator, the channel gain/phase estimator operably coupled to a complex conjugator, the complex conjugator operably coupled to a complex mixer to provide a complex output, and wherein the complex outputs of at least two receiver branches are combined to produce a diversity resultant, a method for determining signal usability of the diversity resultant, the method comprises the steps of:

a) receiving, by each of the at least two receiver branches, a modulated signal;

b) producing, by each of the at least two receiver branches, the complex output based on the modulated signal;

c) in each of the at least two receiver branches, estimating a desired component based on the modulated signal to produce estimated desired components;

d) in each of the at least two receiver branches, estimating an undesired component based on the modulated signal to produce estimated undesired components;

e) combining, independent of the undesired component on each of the at least two receiver branches, the complex output of each of the at least two receiver branches to produce the diversity resultant;

f) determining a desired resultant component based on averaging a summation of the estimated desired components;

g) multiplying each estimated undesired component with each corresponding estimated desired component to produce multiplied components;

h) dividing the multiplied components by the summation of the estimated desired components to produce scaled estimated undesired components;

i) determining an undesired resultant component based on averaging a summation of the scaled estimated undesired components; and j) estimating signal usability of the diversity resultant based on a functional mapping of the desired resultant component and the undesired resultant component into an estimated desired-to-undesired component power ratio.

* * * * *

UNITED STATES PATENT AND TRADEMARK OFFICE
CERTIFICATE OF CORRECTION

PATENT NO. : 5,487,091
DATED : January 23, 1996
INVENTOR(S) : Steven C. Jasper
Mark A. Birchler It is certified that error appears in the above-indentified patent and that said Letters Patent is hereby corrected as shown below:

In col. 7, line 27, "it" should be --a--.

Signed and Sealed this

Fourth Day of June, 1996

Attest:

BRUCE LEHMAN

*Attesting Officer*   *Commissioner of Patents and Trademarks*